United States Patent Office 3,806,556
Patented Apr. 23, 1974

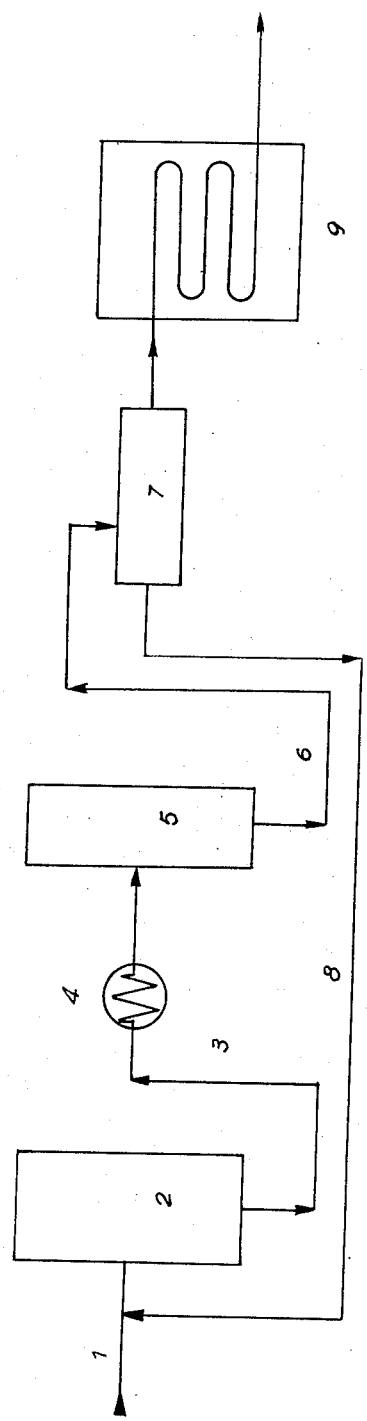

3,806,556
PROCESS FOR POLYMERIZING VINYL MONOMERS
Teo Paleologo and Ugo Nistri, Milan, Italy, assignors to Societá Italiana Resine S.p.A., Milan, Italy
Continuation of abandoned application Ser. No. 736,775, June 13, 1968. This application June 16, 1971, Ser. No. 153,802
Claims priority, application Italy, June 21, 1967, 17,465/67
Int. Cl. C08f 1/02, 7/04
U.S. Cl. 260—880 R        6 Claims

ABSTRACT OF THE DISCLOSURE

Polymers are prepared from vinyl monomers by a process of prepolymerization, removal of monomer and completion of polymerization with supply of heat. Preferably the prepolymerization is in two stages with a cooling in between.

---

The invention relates to processes and apparatus for continuous mass polymerization of monomers of the vinyl type.

By monomers of the vinyl type the compounds of the following formula

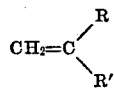

are to be understood, wherein R may be hydrogen or methyl, and R' may be phenyl, nitrile or esterified carboxyl.

It is pointed out moreover that in this description the designation monomer or vinyl monomer includes vinyl monomers as defined above both individually and as mixtures and with or without different quantities of one or more elastomers.

It has long been known in the art that vinyl monomers may be mass polymerized by continuous processes.

For this purpose, according to one of the known processes, large-diameter towers are employed, to the top of which the vinyl monomer, or a prepolymerizate thereof consisting of a mixture of monomer and polymer, is supplied, the polymerized product being recovered at the foot of the column. This technique requires an accurate control of the temperature at the various levels in the tower; more particularly, the reaction heat should be supplied to the upper regions and the temperatures should be kept high at the lower regions of the tower to maintain the viscous polymer flowable.

By this technique polymers of uniform properties are difficult to obtain, above all owing to the difficulty of maintaining the operational conditions constant; moreover, the products mostly contain a high percentage of low molecular weight polymers and volatile substances, which are the cause of difficulty in subsequent processing and use.

According to a further process known in the art, the continuous mass polymerization of vinyl monomers is carried out by a process comprising the three following steps: formation of a prepolymer, polymerization and removal of the monomer residue in the polymerizate. The first stage yields a 30–40% prepolymer in stirred and temperature-controlled vessels in which the temperature of the reacting mass is maintained at the predetermined values.

In the second reaction step the prepolymer is introduced into scroll conveyors heated to temperatures which gradually increase in the direction of movement of the polymer up to 200–250° C. Finally, in the third step the monomer residue is removed by vacuum treatment at high temperature.

As in polymerization in a tower, in this process also the temperature increases in the direction of movement of the mass, the uniformity of such movement being, in this case, ensured by a mechanical arrangement.

However, this process is not free from drawbacks either, owing to the difficulty of maintaining the desired temperature in a mass in which an exothermic and not always entirely controllable reaction occurs.

In other words, "hot points" may arise at which the higher reaction rate leads to the formation of products of a conversion rate higher than desired, which foul the reactor.

These drawbacks are accentuated when stationary or movable bodies, such as coils or stirrers, are arranged within the reactor, since they hinder the free flow of the mass or give rise to dead or blind angles. In additiion to the difficulties created in moving the mass there are adverse effects on the uniformity and properties of the polymer.

All the above described processes are further of low flexibility, in the sense that the properties of the polymer cannot be varied within a sufficiently wide range. Moreover, with the above described processes the hourly output of each polymerizing unit is rather low.

The invention provides a process and apparatus which avoid the above-mentioned drawbacks and yield high grade products of uniform properties which may be varied at will within a wide range of values.

According to the invention the continuous mass polymerization of vinyl monomers is carried out by a process comprising the steps of forming a prepolymer, more or less thoroughly removing monomer residue from the prepolymer, and finally completing polymerization.

In this manner a polymer is obtained which does not require any further treatment to remove the monomer residue, since the latter is present on completion of polymerization in very low quantities, amounting only to 0.01 to 1%.

In a preferred process the prepolymerization is driven up to a very high conversion rate, which is obtained by effecting pre-polymerization in two steps with the use of suitable reactors and preferably with a lowering of the temperature to at lowest about 25° C. between the steps.

In a further preferred process the final polymerization step is carried out under substantial isothermal conditions with supply of heat. This procedure is made possible both by the high conversion of the monomer at the prepolymerization step and removal of the monomer from the prepolymer; in other words, the high conversion rate of the material admitted to the final polymerization step causes the quantity of heat evolved at this step to be low. The reaction can then be carried out in the above described manner.

A preferred but optional feature of the process of the invention consists in using in the final polymerization step simple reactors of a tubular form.

The process of the invention is highly flexible, in that products differing in properties may be obtained simply by variations in the manner of carrying out the process. More particularly, the percentage of converted monomer during the pre-polymerization step and the quantity of monomer removed at the second step of the process can be varied.

By the process of the invention there can be obtained polymers of styrene such as shock-proof polystyrene, polymers and copolymers of acryl and methacryl esters, copolymers of styrene and acryl esters, copolymers of styrene and acrylonitrile and ter-polymers such as styrene-acrylonitrile-butadiene, which are of a high standard and excellent transparency and color properties.

Further advantages of the process of the invention, such as the ease of operation and simplicity of the apparatus will be apparent from the appended description given by way of example. Generally applicable conditions are described with reference to, but without limitation by, a block plant diagram.

Referring to FIG. 1, the vinyl monomers are supplied along piping 1 to a reactor 2, which in the preferred embodiment of the invention is a jacketed boiler equipped with a powerful stirrer.

Operation proceeds in reactor 2 at temperatures ranging between 50° and 120° C., the dwell times amounting to 2 to 24 hours, so as to obtain a part polymerization ranging between 20% and 50% with respect to the monomer feed.

The resulting prepolymer is conveyed by piping 3 to the exchanger 4 where it is cooled to a temperature not below about 25° C.

Cooling is adjusted to cause the prepolymer to act as a cooling agent in the reactor 5, thereby avoiding wholly or in part the need for removal of heat from the reactor by other means.

The material is passed from the exchanger 4 to the reactor 5, in which reaction is carried out at temperatures ranging between 60° and 150° C., the dwell times amounting to 1 to 20 hours, to raise the percentage of polymerizate to values ranging between 40% and 90%.

In the preferred embodiment of the invention the reactor 5 is a vessel provided with stirrer arms such as those of a kneading machine.

The prepolymer is conveyed to the reactor 5, through pipe 6, to a reactor 7.

The polymerization progresses during this travel, the temperature rising to 150° C. to 200 or 250° C. and the percentage of polymerizate reaching values ranging between 75% and 95%.

The reactor 7 is in its preferred embodiment an extruder to which a pressure lower than atmosphere pressure can be applied through pipe 8 for degassing by vacuum.

This results in part removal of the monomer still present. It is reduced to not more than 2–15%.

The distilled monomer is condensed and recycled, after having been purified if desired, to the reactor 2. Obviously, if the feed to 2 comprises a plurality of monomers, the recycled product is, if necessary, returned to its initial composition by replenishment, rectifications or any other procedure suitable for the purpose.

The polymeric material issuing from 7 is conveyed to a tubular reactor 9 in which the reaction is completed over 2 to 10 hours at temperatures ranging between 180° and 250° C.

The reactor 9 is in its preferred embodiment a tube of a diameter ranging between 7 and 70 cm.

The polymeric material issuing from the reactor 9 is granulated by a suitable machine. It is moreover possible to add before pelleting various additives, such as lubricants, plasticizers, coloring matter, anti-oxidants, etc.

The nature of the invention and results thereby attained will be better explained by the following examples.

EXAMPLE 1

Referring to FIG. 1 styrene monomer containing 0.1% di-ter-butylperoxide, 0.05% ter-dodecyl - mercaptan and 1% Vaselin oil is charged to the reactor 2 through pipe 1, the reactor 2 being a jacketed boiler provided with a stirrer.

A dwell time of about 24 hours at a temperature of 90° C. yields a monomer-polymer syrup containing 38–40% polymerizate. The mixture is cooled in the heat exchanger 4 to a temperature of 35–40° C. and conveyed to 5 where a dwell time of 8 hours at a temperature of 110° C. yields a monomer-polymer syrup containing 60–65% polymerizate. The reactor 5 is a vessel with stirring arms.

The mixture is conveyed through 6 to the extruder 7 to which a pressure of about 100 mm. Hg is applied, 20% styrene monomer being removed at a temperature of 170°–180° C.

A product is thus otained which contains about 94% polymerizate. The polymerizate is conveyed to the tubular reactor 9 in which polymerization is completed during 5 hours at a temperature of 240° C.

The resulting polymer, which is transparent white, is of the following properties:

Volatile susbtances=0.5%
Resilence: Izod kg. cm./cm. (ASTM D–256)=1–2
H.D.T.: ° C. (ASTM D–648)=80–82
Melt index: g./10 min. (ASTM D–1238)=2.3

EXAMPLE 2

Referring to FIG. 1 and apparatus described in the first example, styrene monomer containing 0.1% di-cumyl-peroxide, 0.05% ter-dodecyl-mercaptan and 1% Vaselin oil is charged to 2.

With a dwell time of 8 hours at 110° C. in 2 a syrup is obtained containing 38–40% polymerizate, which is cooled to 35–40° C. in the heat exchanger 4. A dwell time of 5 hours at 120° C. in reactor 5 yields a syrup containing 60–65% polymerizate.

15% of monomer is removed in the extruder 7 and a product containing about 93% polymerizate at a temperature of 170–180° C. is obtained. Polymerization is completed in the tubular reactor 9 at 240° C., the dwell time amounting to 5 hours.

The transparent white polymer is of the following properties:

Volatile substances=0.37%
Resilience: Izod kg. cm./cm.=1–2
H.D.T.: ° C.=78
Melt index: g./10 min.=7.3

EXAMPLE 3

Referring to FIG. 1 and using the apparatus described in the first example, styrene monomer containing 0.1% di-ter-butyl-peroxide, 0.05% ter-dodecyl-mercaptan and 2% Vaselin oil is charged to 2.

A syrup is obtained from 2 which contains 38–40% polymerizate at a temperature of 110° C. over a period of 8 hours. After cooling to 35–40° C. in the exchanger 4, the mass is conveyed to 5, where a syrup containing 60–65% polymerizate is obtained at 120° C. by a dwell time of 5 hours.

In the extruder 7–5% monomer is removed at a temperature of 170°–180° C., a product being obtained containing 85% polymerizate.

Finally, polymerization is completed at 9 at a temperature of 220° C. with a dwell time of 8 hours.

The transparent white polymerizate is of the following properties:

Volatile substances: 0.92%
Resilience: Izod kg. cm./cm.=0.8–1.2
H.D.T.: ° C.=73
Melt index: g./10 min.=12.1

EXAMPLE 4

Referring to FIG. 1 and empolying the apparatus described in Example 1 a styrene solution of rubber is fed to 2, the styrene-rubber weight ratio amounting to 97/3. 0.05% di-ter-butyl peroxide, 0.05% ter-dodecyl-mercaptan and 1% Vaselin oil with respect to the monomer-rubber mixture are further charged to 2.

With a dwell time of 6 hours at a temperature of 115° C. a syrup containing 35–38% polymerizate is obtained, which is cooled at 4 to a temperature of 30–35° C. and further polymerized at 5 over three hours at 120° C. up to a polymer content of 58–62%.

In the extruder 7 at a temperature of 170–180° C. 5% styrene monomer is removed, a product containing 86% polymerizate being obtained.

The polymerization is completed over 5 hours at 240° C. in reactor 9.

The properties of the resulting polymer are:

Volatile substances=0.9%
Resilience: Izod kg. cm./cm.=2-3
H.D.T.: ° C.=72
Melt-index: g./10 min.=12-13

EXAMPLE 5

Referring to FIG. 1 and by using the apparatus described in the first example, a styrene solution of rubber is charged to 2, the styrene/rubber ratio amounting to 90/10. 0.05% di-ter-butyl-peroxide, 0.01% isopropyl-xantogen-disulphide and 1% Vaselin oil are further fed to 2, these percentages being by weight with respect to the rubber-styrene solution.

In the prepolymerizer 2 with a dwell time of 6 hours at a temperature of 115° C. a syrup containing 32–34% polymerizate is obtained. After cooling at 4 to 30–35° C. this syrup is further polymerized at 5 over three hours at 120° C. up to a poymer content of 54–56%.

In the extruder 7 20% of the monomer is removed at a temperature of 170–180° C. and a product titrating 95% polymerizate is obtained.

Finally polymerization is completed in the tubular reactor 9 over 5 hours at 240° C.

Properties of the polymer are:

Volatile substances: 0.44%
Resilience: Izod kg. cm./cm.=10–12,
H.D.T.: ° C.=68
Melt-index: g./10 min.=2-3

EXAMPLE 6

Referring to FIG. 1 and using the apparatus described in Example 1 methyl-methacrylate containing 0.15% lauroyl-peroxide and 0.03% octyl mercaptan is charged to 2.

With a dwell time of 15 hours at a temperature of 70° C. a syrup containing 30–32% polymerizate is obtained.

In the reactor 5 over 13 hours at about 105° C. a further polymerization is carried out, which yields a product containing 50–55% polymerizate.

In the extruder 7 at 190°–200° C. 20% monomer is removed.

Finally, polymerization is completed at 9 at 200–210° C. with a dwell time of about 7 hours.

The properties of the polymer are:

Resilience: Izod=1.5–2.00 kg.cm./cm.
H.D.T.=90–91° C.
Melt-index=0.7–9.0 g./10 min.

EXAMPLE 7

Methyl methacrylate is polymerized under the conditions of Example 6 with the only difference that degassing is limited to 10% with respect to the monomer.

A polymer of the following properties is obtained:

Resilience: Izod=1–1.2 kg./cm./cm.
H.D.T.=85°–86° C.
Melt-index=1–1.4 g./10 min.

EXAMPLE 8

The operation is carried out similarly to Example 6 with the difference that the feed is 97% methyl methacrylate and 3% methyl acrylate.

The properties of the resulting product are:

Resilience: Izod=2 kg.cm./cm.
H.D.T.=78°–80° C.
Melt-index=2–3 g./10 min.

EXAMPLE 9

Referring to FIG. 1 and using the apparatus described in Example 1 a mixture comprising 72% by weight styrene and 28% by weight acrylonitrile is charged to the reactor 2.

Moreover, 0.2% lauroyl peroxide, 0.2% di-ter-dodecyl-mercaptan, 0.15% phosphitic antioxidant known by the trade name "Polygard" and 0.5% di-octyl-adipate are further charged to 2, these percentages being by weight with respect to the monomer mixture.

In the reactor 2 at 60–65° C. with a dwell time of 7 hours a syrup containing 30–34% polymer is obtained.

This prepolymer is cooled to about 25–30° C. in the heat-exchanger 4 and polymerizes in the reactor 5 over 7 hours at 75–80° C. up to a polymer content amounting to 60–65%.

In the extruder 7 about 7% of the monomer is removed, the polymerization being then completed in the tubular reactor 9 at 190–200° C. with a dwell time of about 6 hours.

The properties of the polymer are as follows:

Volatile substances: 0.5%
"Charpy" resilience=14–16 kg.cm./sq.cm.
H.D.T.=88–90° C.
Melt-index=1–1.5% g./10 min.

EXAMPLE 10

Operation is carried out similarly to Example 9 but with the difference that about 20% of the monomer is removed in the extruder.

The properties of the polymer are:

"Charpy" resilience=20–22 kg.cm./sq.cm.
H.D.T.=95–97° C.
Melt-index=0.8–1.0 g./10 min.

EXAMPLE 11

Referring to FIG. 1 and by using the apparatus described in Example 1 a mixture comprising 15% polybutadiene, 20% acrylonitrile and 65% styrene by weight is charged to 2.

0.2% lauroyl peroxide, 0.3% ter-dodecyl-mercaptan, 1.5% di-octylphthalate and 0.15% phosphitic antioxidant known by the trade name "Polygard' are further charged to 2, the percentages being by weight with respect to the feed mixture.

Operation is carried out in the reactor 2 at 70° C. with a dwell time of four hours, the polymerizate percentage reached being 30–3%. The prepolymer cooled at 4 to 30° C. is fed to 5 where polymerization progresses up to a polymerizate content of 65–70% at a temperature of 85–90° C. with a dwell time of 6 hours.

In the extruder 7 the monomers are removed by a quantity of 20%, polymerization being then completed in the tubular reactor 9 at 210–220° C. with a dwell time of 6 hours.

The properties of the polymer are:

Volatile substances: 0.3%
Resilience: Izod=15–18 kg.cm./cm.
H.D.T.=93–95° C.

The polymer was found satisfactory in molding.

EXAMPLE 12

The operation is carried out similarly to Example 11 with difference that degassing is limited to values of about 8%.

The properties of the polymer are as follows:

Resilience: Izod=20–25 kg.cm./cm.
H.D.T.=83–85° C.

The polymer proved highly satisfactory on molding.

We claim.
1. A process for preparing polymers from vinyl monomers having the formula

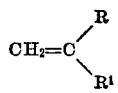

wherein R is selected from the group consisting of hydrogen and methyl and wherein R¹ is selected from the group consisting of phenyl, cyano and methoxy carbonyl comprising the steps of
(1) prepolymerizing said monomers at temperatures of from about 50 to 120° C. for from about 2 to 24 hours forming a monomer-polymer syrup having a polymer quantity of from about 20 to 50% by weight;
(2) cooling said syrup to temperatures not below about 25° C.
(3) prepolymerizing at temperatures of from about 60 to 150° C. for from about 1 to 20 hours forming a monomer-polymer syrup having a polymer quantity of from about 40 to 90%;
(4) concentrating the polymer concentration in said syrup to from about 75 to 95% by weight, while the temperature is raised to from about 150 to 250° C.;
(5) partially removing said monomer from said syrup to obtain a monomer content of from about 2 to 15% by weight in said syrup; and
(6) completing the polymerization at temperatures of from about 180 to 250° C. under substantially isothermic conditions with supplying of heat for from about 2 to 10 hours.
2. The process as claimed in claim 1, wherein the concentrating of the polymer in step (4) is by applying a vaccum.
3. The process as claimed in claim 1, wherein said concentrating of the polymer concentration of step (3) is by continuing the prepolymerization to increase said syrup concentration while causing said syrup obtained in step (3) to flow to a monomer removal zone.
4. The process as claimed in claim 1, wherein said vinyl monomer is styrene, acrylonitrile, methyl acrylate or methyl methacrylate.
5. The process as claimed in claim 4, wherein said vinyl monomer is styrene.
6. The process as claimed in claim 5, wherein rubber is additionally present with said styrene.

References Cited
UNITED STATES PATENTS

| | | | |
|---|---|---|---|
| 2,496,653 | 2/1950 | Allen et al. | 260—93.5 |
| 2,745,824 | 5/1965 | Melchore | 260—93.5 |
| 3,243,481 | 3/1966 | Ruffing et al. | 260—880 |
| 3,268,625 | 8/1966 | Jones et al. | 260—880 |
| 3,439,065 | 4/1969 | Luftglass | 260—880 |

JAMES A. SEIDLECK, Primary Examiner

U.S. Cl. X.R.
260—85.5 HC, 88.7 G, 89.5 A, 93.5 R